(12) United States Patent
Hock et al.

(10) Patent No.: US 12,090,634 B2
(45) Date of Patent: Sep. 17, 2024

(54) ROBOT CELL FOR MACHINE TOOL OR ASSEMBLY MACHINE

(71) Applicant: INDUSTRIE-PARTNER GMBH RADE-BEUL-COSWIG, Coswig (DE)

(72) Inventors: Ralf Josef Hock, Chemnitz (DE); Joerg Franz, Dresden (DE); Falko Hahnewald, Doberschau-Gaussig (DE)

(73) Assignee: INDUSTRIE-PARTNER GMBH RADEBEUL-COSWIG, Sachsen (DE)

( * ) Notice: Subject to any disclaimer, the term of this patent is extended or adjusted under 35 U.S.C. 154(b) by 212 days.

(21) Appl. No.: 17/615,676

(22) PCT Filed: Jul. 3, 2020

(86) PCT No.: PCT/EP2020/000126
§ 371 (c)(1),
(2) Date: Dec. 1, 2021

(87) PCT Pub. No.: WO2021/013375
PCT Pub. Date: Jan. 28, 2021

(65) Prior Publication Data
US 2022/0234213 A1 Jul. 28, 2022

(30) Foreign Application Priority Data
Jul. 19, 2019 (DE) .................. 202019003026.3

(51) Int. Cl.
*B25J 13/08* (2006.01)
*B25J 5/00* (2006.01)
(Continued)

(52) U.S. Cl.
CPC ............ *B25J 13/089* (2013.01); *B25J 5/007* (2013.01); *B25J 9/0018* (2013.01); *B25J 9/1697* (2013.01); *B25J 11/005* (2013.01); *B25J 11/006* (2013.01)

(58) Field of Classification Search
CPC ...... B25J 9/1676; B25J 13/089; B25J 9/0018; B25J 5/007; B25J 19/06; B25J 9/1697;
(Continued)

(56) References Cited

U.S. PATENT DOCUMENTS

| 5,220,718 A * | 6/1993 | Speller, Sr. ............ B25J 15/103 |
| | | 29/430 |
| 2018/0222064 A1* | 8/2018 | Nishi ...................... B25J 5/007 |
| 2020/0238466 A1* | 7/2020 | Morimura .......... B23Q 3/15513 |

* cited by examiner

*Primary Examiner* — Said Bouziane
(74) *Attorney, Agent, or Firm* — Andrew Wilford

(57) ABSTRACT

The invention relates to a robot cell (1) provided for use on machine tools and/or assembly machines. The robot cell (1) includes a handling device, e.g. an industrial robot (2). By means of the robot cell (1), a workpiece (4) to be processed on the machine tool or the assembly machine can be removed from an incoming transport container, pre-processed, orientated, inserted into the machine tool or assembly machine, removed from the machine tool or the assembly machine, measured and placed or stacked in an outgoing transport container. The robot cell (1) can be used on different machine tools or assembly machines. In order to facilitate operation of a robot cell (1) of this kind, the robot cell (1) can be used on the machine tool or the assembly machine without being linked or connected to the machine tool or the assembly machine, the robot cell (1) has an optics device (5), by means of which, in conjunction with reference markings on the machine tool or assembly machine, the robot cell (1) can be positioned in its operating position on the machine tool or the assembly machine, wherein by means of a control apparatus (6) and the handling device connected thereto or the industrial robot (2) connected thereto of the robot cell (1), operating elements on the machine tool or assembly machine can be contacted, operated and controlled.

18 Claims, 1 Drawing Sheet

(51) Int. Cl.
*B25J 9/00* (2006.01)
*B25J 9/16* (2006.01)
*B25J 11/00* (2006.01)
(58) Field of Classification Search
CPC ........ B25J 19/021; B25J 21/00; B25J 13/006; B25J 5/00; B25J 11/006; B25J 11/005; G05B 19/41825; G05B 2219/50362; B23Q 7/04
See application file for complete search history.

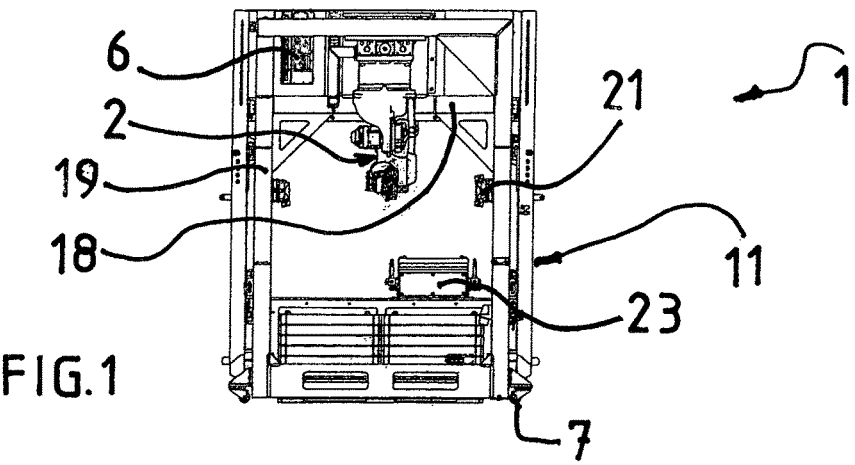
FIG.1
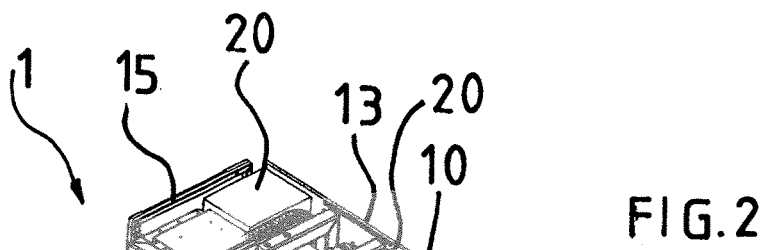
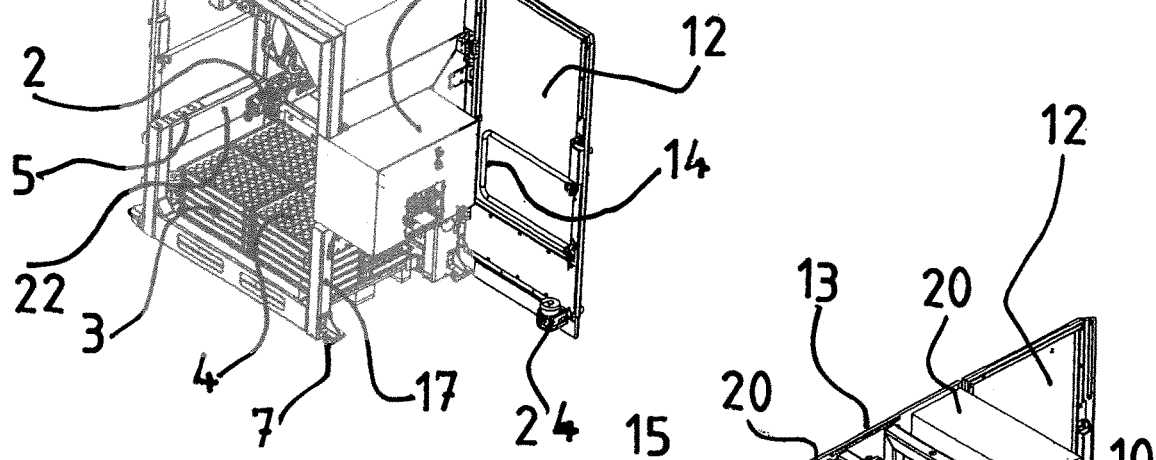
FIG.2
FIG.3
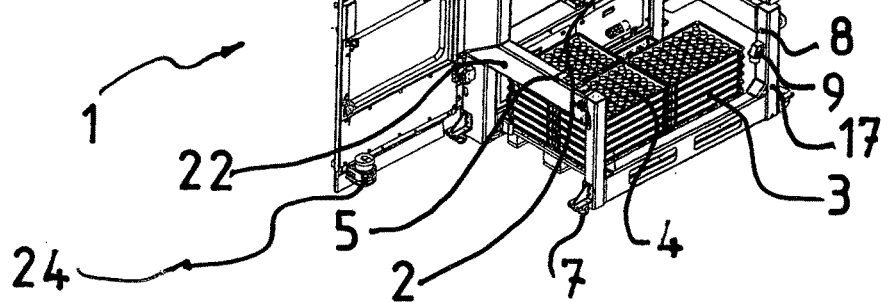

ROBOT CELL FOR MACHINE TOOL OR ASSEMBLY MACHINE

CROSS REFERENCE TO RELATED APPLICATIONS

This application is the US-national stage of PCT application PCT/EP2020/000126 filed 3 Jul. 2020 and claiming the priority of German patent application 202019003026.3 itself filed 19 Jul. 2019.

FIELD OF THE INVENTION

The invention relates to a robot cell for use on machine tools and/or assembly machines.

BACKGROUND OF THE INVENTION

A manipulator, for example an industrial robot, can remove a workpiece to be processed on the machine tool or the assembly machine from an incoming transport container, after which it is pre-processed, oriented, inserted into the machine tool or the assembly machine, removed from the machine tool or the assembly machine, measured, and placed or stacked in an outgoing transport container, and that can be used on different machine tools or assembly machines.

OBJECT OF THE INVENTION

On the basis of the prior art described above, the invention addresses the problem of providing a robot cell for use on machine tools and/or assembly machines, which can be used with considerably less effort and in a particularly versatile manner.

SUMMARY OF THE INVENTION

This problem is inventively solved in that the robot cell can be used on the machine tool or assembly machine without being linked and connected to the machine tool or assembly machine, that the robot cell has an optics device that can, in conjunction with reference markings on the machine tool or assembly machine, position the robot cell in its operating position on the machine tool or assembly machine, and where a controller and the manipulator connected thereto or the industrial robot connected thereto of the robot cell can contact, operate, and control operating elements on the machine tool or on the assembly machine. The technical effort required for setting up the robot cell to work in conjunction with a machine tool and/or an assembly machine can thus be reduced considerably.

According to an advantageous development of the robot cell according to the invention, the controller thereof can be connected by a communication bus and an interface, preferably one configured as a standard interface, to a control on the machine tool or assembly machine.

The controller of the robot cell according to the invention is expediently designed such that it can be used for automatically detecting, classifying and eliminating malfunctions of the machine tool or assembly machine.

Furthermore, in an advantageous development of the robot cell according to the invention, the controller thereof is capable of recognizing individual machine tools or assembly machines, machine tool types or assembly machine types on which the robot cell has already been used. This too further simplifies the effort required to set up the robot cell for working in conjunction with the corresponding assembly machine or the corresponding machine tool.

Advantageously, the controller of the robot cell according to the invention can be used to record, store, process and output error messages and data sets concerning the operating status of the machine tool or assembly machine.

The robot cell can be expediently set up by a mobile terminal.

Advantageously, the robot cell according to the invention has a transmitter unit that can transmit data sets (for example video streams, images, messages) to the mobile terminal, wherein the mobile terminal can be used to intervene in the operation of the robot cell.

According to another advantageous embodiment, the robot cell according to the invention is capable of traveling on the ground, for which purpose it has, for example rollers.

In order to facilitate the transport of the robot cell according to the invention to and from various operation sites, it is advantageous if the manipulator of the robot cell according to the invention can be used to close and open workroom doors.

The optics device and the controller of the robot cell according to the invention can be used in an expedient manner to define a collision-free trajectory of the manipulator to, for example a workpiece clamping apparatus of the machine tool or assembly machine. Interferences with the operation of the robot cell can thus be effectively excluded.

The robot cell is advantageously self-propelled.

In order to render the operation of the robot cell according to the invention even more versatile, the latter advantageously has an unmachined parts storage unit for workpieces to be processed on the machine tool or assembly machine, into which the workpieces to be processed can be transferred from an automated, driverless incoming transport unit.

Advantageously, this unmachined parts storage unit can temporarily store workpieces of different shapes and sizes.

It is furthermore beneficial if the robot cell has a machined parts storage unit for workpieces that have been processed on the machine tool or assembly machine, from which the processed workpieces can be transferred into an automated, driverless outgoing transport unit.

Advantageously, the temporary storage of workpieces of different shapes and sizes in this machined parts storage unit should be possible.

According to another advantageous development of the robot cell according to the invention, the manipulator thereof is capable of handling workpieces in any position in the unmachined and/or machined parts storage unit(s).

It is furthermore advantageous if the robot cell according to the invention has an autonomous current supply, as this can render the use of this robot cell even more versatile.

Advantageously, the robot cell also has a compressed air supply.

For further improving the method step to be carried out by the robot cell and the corresponding machine tool or the corresponding assembly machine, it is advantageous if the robot cell has a measuring apparatus for the workpieces processed by the machine tool or assembly machine, by means of which the processed workpieces can be measured, the recorded measurement data can be compared to predetermined target values, and correction values derived from the comparison between the measured and target values can be outputted to control of the machine tool or assembly machine.

Advantageously, the robot cell according to the invention can be approximately positioned, by means of rollers provided thereon or by suitable transport equipment such as a pallet truck or forklift, on the machine tool or assembly machine and connected, in the approximately positioned position, to an external power and compressed air source.

The procedure to be carried out by the robot cell and the corresponding machine tool or assembly machine can be further simplified if the controller of the robot cell is capable of controlling at least one workpiece clamping apparatus of the machine tool or assembly machine.

Advantageously, the robot cell according to the invention has vibration-detecting, acoustical and/or optical measurement and analysis apparatuses, by means of which vibrations and/or movements of the machine tool or assembly machine can be detected and analyzed and, in particular in the event of a malfunction, the controller of the machine tool or assembly machine can be accessed.

Measurement and analysis apparatuses that can be used for monitoring an environment of the robot cell for irregular conditions and automatically initiating suitable measures in the event that irregular conditions are detected, are expediently allocated to the controller of the robot cell according to the invention.

According to an advantageous embodiment, the robot cell according to the invention has secondary machining modules, for example a deburring module for deburring workpieces removed from the machine tool or assembly machine.

Furthermore, the robot cell can advantageously have quality assurance modules.

According to a very easily installed embodiment of the robot cell according to the invention, the housing thereof has an open side which faces the machine tool or assembly machine.

If the housing of the robot cell has a wall on its first end face adjacent to the open side, which can be pivoted from its closed position into a position aligning with a side wall of the housing opposite the open side, a free movement zone can be created for the manipulator of the robot cell because the first end face of the robot cell is then also open.

In order to create a zone in the work area of the robot cell or of the industrial robot thereof that is protected to a certain degree against entry of persons, it is advantageous if the wall pivotal on the first end face of the housing has on its inside surface a protective bar that can be moved to and from a rest position, in which it contacts the inside surface of the wall, and an operating position, in which it preferably projects roughly perpendicularly from the inside surface of the wall. A work zone that is virtually closed off to the outside, is created by the wall on the first end face of the housing, the protective bar projecting perpendicularly from the inside surface of this wall, and the area of the machine tool or assembly machine opposite the wall aligning with the side wall of the housing.

According to another development of the robot cell according to the invention, the housing thereof is accordingly likewise provided with a wall on its second end face adjacent to the open side, which can be pivoted from its closed position into a position aligning with the side wall of the housing opposite the open side. The work zone for the manipulator of the robot cell can thus be enlarged there as well.

Obviously, a protective bar can also be provided on the inside surface of the wall pivotal on the second end face of the housing, which bar can be pivoted to and from a rest position, in which it contacts the inside surface of the wall, and an operating position, in which it preferably projects roughly perpendicularly from the inside surface of the wall. In like manner, a work zone that is virtually closed off to the outside can also be defined at this end face of the robot cell.

The manipulator or industrial robot of the robot cell is advantageously mounted on a suspension that is in turn mounted on two vertical beams that are on the two side ends of the side wall of the housing. It is thus possible to dispense with continuous vertical components on the open side of the housing, meaning that continuous vertical components obstructing the work zone of the manipulator are not present at the corners of the open side of the housing.

Control cabinets of the robot cell and the controller of the same are advantageously above the manipulator or industrial robot mounted on the suspension such that the movement or work zone of the manipulator or industrial robot is restricted as little as possible by these components.

In order to design the operation of the robot cell on the machine tool or assembly machine to be as safe and trouble-free as possible, it is advantageous if an area scanner is provided on each wall, in the distal end region thereof in the open position relative to the housing, by means of which a safety zone bordered by the respective walls can be scanned and, in the event that foreign bodies enter the safety zone, a trigger signal can be output to the controller of the robot cell in order to slow or stop the movement of the manipulator or industrial robot. Accordingly, the controller of the robot cell then slows or stops the movement of the manipulator as required.

The operation or use of the robot cell can be further simplified if each wall of the robot cell has operating and/or signaling elements that can initiate routine operating processes (for example stop, start, loading of the unmachined parts storage unit, etc.).

In order to design, for example, a transport of the robot cell such that it is as trouble-free as possible, it is advantageous if the walls thereof can be locked in their closed position on the housing or on a frame of the robot cell.

Procedures for transporting the robot cell can be further simplified if at least one handle, for example a bow-type handle that can be used for pushing and pulling the robot cell, is formed on the outer surfaces of each wall.

Advantageously, the housing of the robot cell can be closed on its open side by a suitable cover or the like, for example when transporting the robot cell.

BRIEF DESCRIPTION OF THE DRAWING

The invention shall be explained in more detail below, with reference to an embodiment and to the drawings. therein:

FIG. 1 is a schematic view of an embodiment of a robot cell according to the invention, from the side of the robot cell facing a machine tool or an assembly machine;

FIG. 2 is a perspective view of the embodiment of the robot cell according to the invention shown in FIG. 1 in a partially open position; and FIG. 3 is a perspective view of the embodiment of the robot cell according to the invention shown in FIGS. 1 and 2 in a fully open position.

SPECIFIC DESCRIPTION OF THE INVENTION

An embodiment of a robot cell 1 according to the invention, which is described below in more detail with reference to FIGS. 1 to 3, is intended for use on machine tools or assembly machines that are not shown in the figures.

Associated with the robot cell 1 is a manipulator that is configured as an industrial robot 2 in the embodiment illustrated in FIGS. 1 to 3. The industrial robot 2 can be used to remove a workpiece that is supplied in an incoming transport container or workpiece support 3 of the robot cell 1 and that is to be processed on the machine tool not shown in the drawing or on the assembly machine not shown in the figures, from the incoming transport container or workpiece support 3.

It is furthermore possible for the industrial robot 2 to pre-process and orient this workpiece 4 removed from the workpiece support 3 before the industrial robot 2 inserts it into the machine tool or assembly machine.

After the workpiece 4 has been processed in the machine tool or assembly machine, the industrial robot 2 can remove the processed product from the machine tool or the assembly machine. The industrial robot 2 measures the workpiece 4 and then places or stacks it in an outgoing transport container after the measurement.

The robot cell 1 can be used on various machine tools or on various assembly machines. Different workpieces 4 can be processed by the robot cell 1.

To use the robot cell 1 on the corresponding machine tool or corresponding assembly machine, it is not necessary for the robot cell 1 to be linked or connected to the machine tool or assembly machine.

In order to enable such an interaction with the machine tool or assembly machine, the robot cell 1 is equipped with an optics device 5 that can be used to position the robot cell 1 on the machine tool or assembly machine, wherein the optics device 5 works in conjunction with reference markings formed on the machine tool or assembly machine in order to position the robot cell 1.

Accordingly, the robot cell 1 can be positioned in its operating position on the machine tool or assembly machine by the optics device 5. A controller 6 of the robot cell 1 and the industrial robot 2 can be used to contact, operate and control operating elements of the machine tool or assembly machine.

In the illustrated embodiment, the controller 6 of the robot cell 1 has a communication bus and a standard interface, to which the controls on the machine tool or assembly machine (not illustrated in the figures) can be connected.

The controller 6 of the robot cell 1 can be used for automatically detecting, classifying and eliminating any malfunctions of the machine tool or assembly machine. The controller 6 can recognize individual machine tools or assembly machines, machine tool types or assembly machine types after contacting the same, provided that the robot cell 1 has already been used on the respective machine tools, the respective assembly machines, the respective machine tool types or the respective assembly machine types. The control device can be used to record, store, process and output error messages and data sets concerning the operating status of the corresponding machine tool or the corresponding assembly machine on which the robot cell 1 is arranged.

In the embodiment illustrated in the figures, the robot cell 1 is configured in such a way that it can be set up with the aid of a mobile terminal that is not shown in the figures.

To this end, the robot cell 1 has a transmitter unit that transmits data sets in the form of video streams, images, etc. and messages to the mobile terminal. The mobile terminal can be used to intervene in the operation of the robot cell 1.

In the case of the embodiment shown in FIGS. 1 to 3, the robot cell 1 has rollers 7 on its bottom surface and can thus travel on the ground. The industrial robot 2 of the robot cell 1 can be used to open doors or the like located at or on the way to the place of use.

The optics device 5 can be used to record and scan the environment of the robot cell 1 such that obtained data in the optics device 5 can be transmitted to the controller and recorded and processed therein in order to define a collision-free trajectory for the industrial robot 2 of the robot cell 1 to the machine tool or assembly machine such that the industrial robot 2 can transfer a workpiece 4 to, for example a workpiece clamping device of the machine tool or assembly machine.

A drive device that is not shown in any detail in the figures, can be associated with the robot cell 1. The robot cell 1 is self-propelled by this drive device and the rollers 7.

The robot cell 1 can be equipped with an unmachined parts storage unit, wherein workpieces to be processed on the machine tool or assembly machine can be stored in this unmachined parts storage unit. An automated, driverless incoming transport unit can be used to transfer these workpieces into the unmachined parts storage unit. Workpieces of different shapes and sizes can be temporarily stored in the unmachined parts storage unit.

Obviously, the robot cell 1 can also be equipped with a machined parts storage unit, in which workpieces that have been processed on the machine tool or assembly machine can be arranged. The processed workpieces can then be transferred from this machined parts storage unit into an automated, driverless outgoing transport unit. This machined parts storage unit of the robot cell 1 is also suitable for temporarily storing workpieces of different shapes and sizes.

The industrial robot 2 of the robot cell 1 is able to manipulate the workpieces regardless of how they are oriented in the unmachined or machined parts storage unit.

The robot cell 1 can have an autonomous power supply that can supply electrical energy to the industrial robot 2 and, for example the drive unit described above. Furthermore, an electrical connector 8 can be used to connect the robot cell 1 to an external power supply. A pneumatic connector 9 can be used to connect the robot cell 1 to an external compressed air supply.

The controller 6 of the robot cell 1 is connected to a measuring device on the robot cell, which is used to measure the workpieces that were processed on the machine tool or assembly machine and returned to the robot cell 1. The measurement data thus obtained are compared to predetermined target values for the processed workpieces. Correction values that are generated from the comparison between the recorded measurement values and the target values, can be output to the controls on the machine tool or assembly machine by the controller 6 of the robot cell.

The robot cell 1 can be approximately positioned in the region of the machine tool or assembly machine by its drive unit and the rollers driven thereby, or alternatively by, for example a forklift. In this approximately positioned position, the robot cell 1 can be hooked up to an external power source or to an external compressed air source by the electrical connector 8 or the pneumatic connector 9, respectively.

In the case of the embodiment, the controller 6 of the robot cell 1 is embodied such that it can be used to control at least one workpiece clamping device (not illustrated in the figures) of the machine tool or assembly machine.

In the illustrated embodiment, vibration-detecting, acoustical and optical measuring and analysis apparatuses are associated with the controller 6 of the robot cell 1. These measuring and analysis apparatuses can be used for detecting and analyzing vibrations and movements of the machine tool or assembly machine. The controller 6 on the robot cell can be used to access the controller of the machine tool or assembly machine, in particular in the event of a malfunction. Furthermore, the measuring and analysis apparatus of the controller 6 of the robot cell 1 can be used to monitor an environment of the robot cell 1 for irregular conditions. When such irregular conditions are detected in the environment of the robot cell 1, suitable measures for eliminating the irregularities can be automatically initiated by the controller 6 of the robot cell 1.

In the embodiment illustrated in FIGS. 1 to 3, the robot cell 1 has a secondary machining module in the form of a deburring module 10 that can be used for deburring workpieces that have been removed from the machine tool or assembly machine and delivered to this deburring module 10 of the robot cell 1.

The robot cell 1 as illustrated in FIGS. 1 to 3 can also have quality assurance modules that can monitor the quality of the workpieces received by the machine tool or assembly machine.

As can be discerned from studying FIGS. 1 to 3 together, the robot cell 1 has a housing 11 that in the case of the embodiment shown in FIGS. 1 to 3 is open on the side of the robot cell 1 with which the robot cell 1 faces the machine tool or assembly machine. On its first end face adjacent to this open side, the housing 11 has a wall 12 that can be pivoted from its closed position shown in FIG. 1 into an open position shown in FIG. 2, in which this wall 12 aligns with the side wall 13 of the housing 11 of the robot cell 1 that is opposite the open side of the housing 11 of the robot cell 1. A protective bar 14 is provided on the inside of the wall 12.

In the closed position of the wall 12, this protective bar 14 lies on the inside surface of the wall 12. When the wall 12 assumes the pivoted position shown in FIG. 2, in which the wall 12 aligns with the side wall 13 of the housing 11 of the robot cell 1, the protective bar 14 can be moved from the position shown in FIG. 2, in which it is in contact with the inside surface of the wall 12 and which is its rest position, into an operating position, in which the protective bar 14 projects roughly perpendicularly from the inside surface of the wall 12. A safety zone that is formed by the protective bar 14 in its operating position and the machine tool or assembly machine, can thus be provided next to the robot cell 1.

As can be discerned in particular from FIG. 3, in the embodiment described with reference to FIGS. 1 to 3 the housing 11 of the robot cell 1 also has a wall 15 on its other, second end face adjacent to the open side of the housing 11, which wall is mounted pivotally on the housing 11 or on the side wall 13 of the housing 11. This wall 15 can also be pivoted from its closed position shown in FIGS. 1 and 2 into its open position shown in FIG. 3. Like the wall 12 on the other end face of the housing 11, the wall 15 in its open position aligns with the side wall 13 opposite the open side of the housing 11.

On its inside or inside surface, the wall 15 likewise has a protective bar 16 that can be pivoted between the rest position shown in FIGS. 2 and 3, in which it contacts the inside or inside surface of the wall 15, and an operating position, in which it projects roughly perpendicularly from the inside of the wall 15.

The two walls 12, 15 in their open positions, in which they align with the side wall 13 of the housing 11 of the robot cell 1, the two protective bars 14, 16 in their operating positions, in which they project perpendicularly from the insides or inside surfaces of the walls 12, 15, and the machine tool or assembly machine, on which the robot cell 1 is located, thus create a safety zone on both sides of the robot cell 1 that is not readily accessible for personnel, etc.

As can be discerned in particular from FIG. 3, in the open position of the walls 12, 15 a relatively barrier-free work zone is created for the industrial robot 2 of the robot cell 1 because continuous beams, wall parts, or the like are not present on the open side of the robot cell 1 that faces the machine tool or assembly machine. Vertical members 17 at the two corners of the open front side of the robot cell 1 end roughly above the vertical area of the robot cell 1, in which the workpiece supports 3 are arranged in the illustrated embodiment. To a large extent, the industrial robot 2 is thus able to move freely above the area occupied by the workpiece supports 3. In the illustrated embodiment, the deburring module 10, into which workpieces 4 can be introduced by the industrial robot 2, is installed in the area of the wall 12 on the first end face of the housing 11 of the robot cell 1.

The industrial robot 2 is in turn mounted on a suspension 18. In the case of the embodiment of the robot cell 1 shown in FIGS. 1 to 3, the suspension 18 is in turn mounted on two vertical beams 19 that are seated on the rear corners of the robot cell 1 on the side wall 13. Support or reinforcement members are provided at the junction between the suspension 18 and the vertical beams 19.

In the embodiment of the robot cell 1 described with reference to FIGS. 1 to 3, the controller 6 of the robot cell 1, including components directly associated therewith, and control cabinets 20 of the robot cell 1 are above the industrial robot 2 on or beside the suspension 18.

In the illustrated embodiment, the industrial robot 2 of the robot cell 1 is designed as a 6-axis robot. Plug connection means 21 for diverse peripheral devices can be associated with the robot cell 1, wherein these plug connection means can be mounted on the vertical beams 19.

In the illustrated embodiment, the vertical beams 19 at the open front side of the housing 11 of the robot cell 1 are connected at their top ends by cross beams 22 to the vertical beams 19 in the area of the side wall 13 and thus virtually form a basic frame of the robot cell 1, in the area of which the workpiece supports 3 are arranged. The optics device 5 of the robot cell 1 is on the top side of the (in FIG. 3) left cross beam 22.

Also associated with the robot cell 1 illustrated in FIGS. 1 to 3 is a blowoff station 23 that is mounted on the side wall 13 of the housing 11 of the robot cell 1 that is opposite the open side of the robot cell.

On the bottom corners of the free edges of the two walls 12, 15, provision is made of area scanners 24 that can be used to monitor the area next to the actual robot cell 1. The delimited safety zone associated with the respective walls 12, 15 is thus scanned. In the event that the area scanner 24 detects the entry of a foreign body or the like in this safety zone, the area scanner 24 outputs a trigger signal to the controller 6 attached thereto of the robot cell 1, in response to which the controller 6 then slows or stops the operation of the industrial robot 2 of the robot cell 1.

The walls 12, 15 of the housing 11 of the robot cell can have operating and/or signaling elements in order to initiate routine operating processes of the robot cell 1, for example stop of the operation thereof, start of the operation thereof, loading of the unmachined parts storage unit, etc.

In order to protect the equipment of the robot cell 1 housed in the interior of the robot cell 1, in particular during the transport of the robot cell 1, the walls 12, 15 can be locked in their closed positions on the housing 11 or frame of the robot cell 1.

At least one handle that in particular can be configured as a bow-type handle and that can be used for pushing and pulling the robot cell 1, can be provided on the outside surfaces of the walls 12, 15.

Where required, for example during transport, a cover or the like can be used to close the open side of the housing 11 of the robot cell 1.

The invention claimed is:

1. A robot cell for use on machine tools and/or assembly machines, the cell comprising:
   a housing that has an open side facing the machine tool or assembly machine, has a first end face adjacent the open side, a side wall opposite the open side, and a wall on the end face and pivotable from a closed position into a position aligning with the side wall;
   a manipulator by which a workpiece to be processed on the machine tool or assembly machine is removed from an incoming transport container, pre-processed, oriented, inserted into the machine tool or the assembly machine, removed from the machine tool or assembly machine, measured, and placed or stacked in an outgoing transport container, and that is used on different machine tools or assembly machines, the robot cell being usable without being linked and connected to the machine tool or assembly machine;
   an optics device for, in conjunction with reference markings on the machine tool or assembly machine, positioning the robot cell in its operating position on the machine tool or assembly machine; and
   a controller connected to the manipulator for contacting, operating, and controlling operating elements on the machine tool or assembly machine.

2. The robot cell according to claim 1, wherein the controller is connected, by a communication bus and a standard interface, to another controller on the machine tool or assembly machine.

3. The robot cell according to claim 1 wherein the controller is usable for automatically detecting, classifying and eliminating malfunctions of the machine tool or assembly machine.

4. The robot cell according claim 1, wherein the controller is capable of recognizing individual machine tools or assembly machines, machine tool types or assembly machine types on which the robot cell has already been used.

5. The robot cell according to claim 1, wherein the controller records, stores, processes and outputs error messages and data sets concerning the operating state of the machine tool or assembly machine.

6. The robot cell according to claim 1, wherein the robot cell is a mobile terminal.

7. The robot cell according to claim 6, further comprising:
   a transmitter unit for transmitting data sets to the mobile terminal for intervening in the operation of the robot cell.

8. The robot cell according to claim 1, wherein the optics device and controller define a collision-free trajectory of the manipulator.

9. The robot cell according to claim 1, further comprising:
   an unmachined parts storage unit for workpieces to be processed on the machine tool or assembly machine, into which the workpieces to be processed are transferred from an automated, driverless incoming transport unit.

10. The robot cell according to claim 1, further comprising:
    an autonomous power supply.

11. The robot cell according to claim 1, further comprising:
    a compressed air supply.

12. The robot cell according to claim 1, further comprising:
    a measuring apparatus for the workpieces processed by the machine tool or assembly machine for measuring the processed workpieces and making and then comparing recorded measurement data to preset target values, and generating correction values resulting from the comparison between the measured and target values and outputting same to the controller.

13. The robot cell according to claim 1, further comprising:
    a workpiece clamping apparatus of the machine tool or assembly machine controlled by the controller of the robot cell.

14. The robot cell according to claim 1, further comprising:
    vibration-detecting, acoustical and/or optical measuring and analysis apparatuses for detecting and analyzing vibrations and/or movements of the machine tool or assembly machine and, in the event of a malfunction, accessing the controller of the machine tool or assembly machine.

15. The robot cell according to claim 14, wherein the measuring and analysis apparatus monitors an environment of the robot cell for irregular conditions and, in the event that irregular conditions are detected, initiates suitable measures automatically.

16. The robot cell according to claim 1, wherein the wall has on its inside surface a protective bar movable between a rest position in which it contacts the inside surface of the wall and an operating position in which it projects from the inside surface of the wall.

17. The robot cell according to claim 1, wherein the housing has, on its second end face adjacent to the open side, another wall pivotable from its closed position into a position aligning with the side wall of the housing opposite the open side.

18. The robot cell according to claim 17, wherein the other wall of the housing is pivotal on the second end face of the housing and has on its inside surface a protective bar pivotable between a rest position in which it contacts the inside surface of the other wall and an operating position in which it projects from the inside surface of the other wall.

* * * * *